United States Patent [19]  
Gardon et al.

[11] Patent Number: 4,913,720  
[45] Date of Patent: Apr. 3, 1990

[54] GLASS SHEET MODULATED QUENCHING

[75] Inventors: Robert Gardon, Farmington Hills, Mich.; Alejandro G. Bueno, Whitehouse; Donivan M. Shetterly, Toledo, both of Ohio

[73] Assignee: Glasstech, Inc., Perrysburg, Ohio

[21] Appl. No.: 251,194

[22] Filed: Sep. 29, 1988

[51] Int. Cl.[4] .......................................... C03B 27/04
[52] U.S. Cl. ...................................... 65/114; 65/104; 65/119
[58] Field of Search ................. 65/104, 114, 117, 119, 65/115

[56] References Cited

U.S. PATENT DOCUMENTS

| | | | |
|---|---|---|---|
| 3,301,650 | 1/1967 | Ward | 65/117 |
| 4,004,901 | 1/1977 | Starr | 65/104 X |
| 4,204,845 | 5/1980 | Shields et al. | 65/114 |
| 4,236,909 | 12/1980 | Thomas et al. | 65/115 |
| 4,566,893 | 1/1986 | Hopkins et al. | 65/117 X |

FOREIGN PATENT DOCUMENTS 0487822  6/1938  United Kingdom .................. 65/114

Primary Examiner—Arthur Kellogg  
Attorney, Agent, or Firm—Brooks & Kushman

[57] ABSTRACT

A glass sheet tempering method and resultant glass sheet are disclosed as being provided by modulated quenching that initially cools the oppositely facing surfaces of a conveyed glass sheet at a first cooling station (14) with a first rate of heat transfer for a finite time to cool the surfaces from tempering temperature to below the strain point without cooling the center of the glass sheet below the strain point. Thereafter the oppositely facing surfaces of the conveyed glass sheet are cooled within a second cooling station (15) at a second rate of heat transfer less than the first rate to initially cool the center of the glass sheet below the strain point without corresponding surface cooling, and thereafter further cools the center and the sruface. The second rate of heat transfer is of a magnitude so that the surface temperature initially increases without going back substantially above the strain point prior to subsequently again cooling. The modulated quenching provides a relative large ratio of surface compression to center tension without excessive magnitudes of stress.

4 Claims, 2 Drawing Sheets

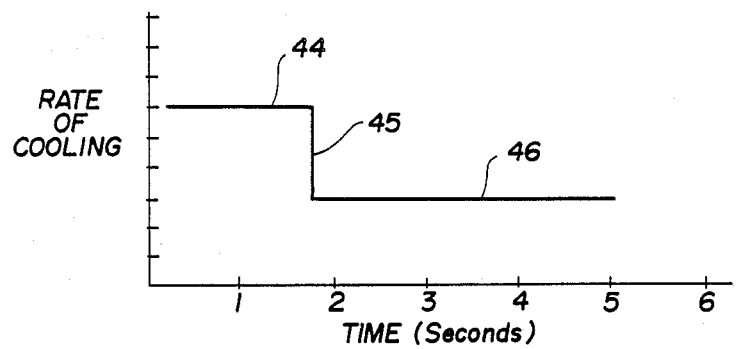
Fig. 3
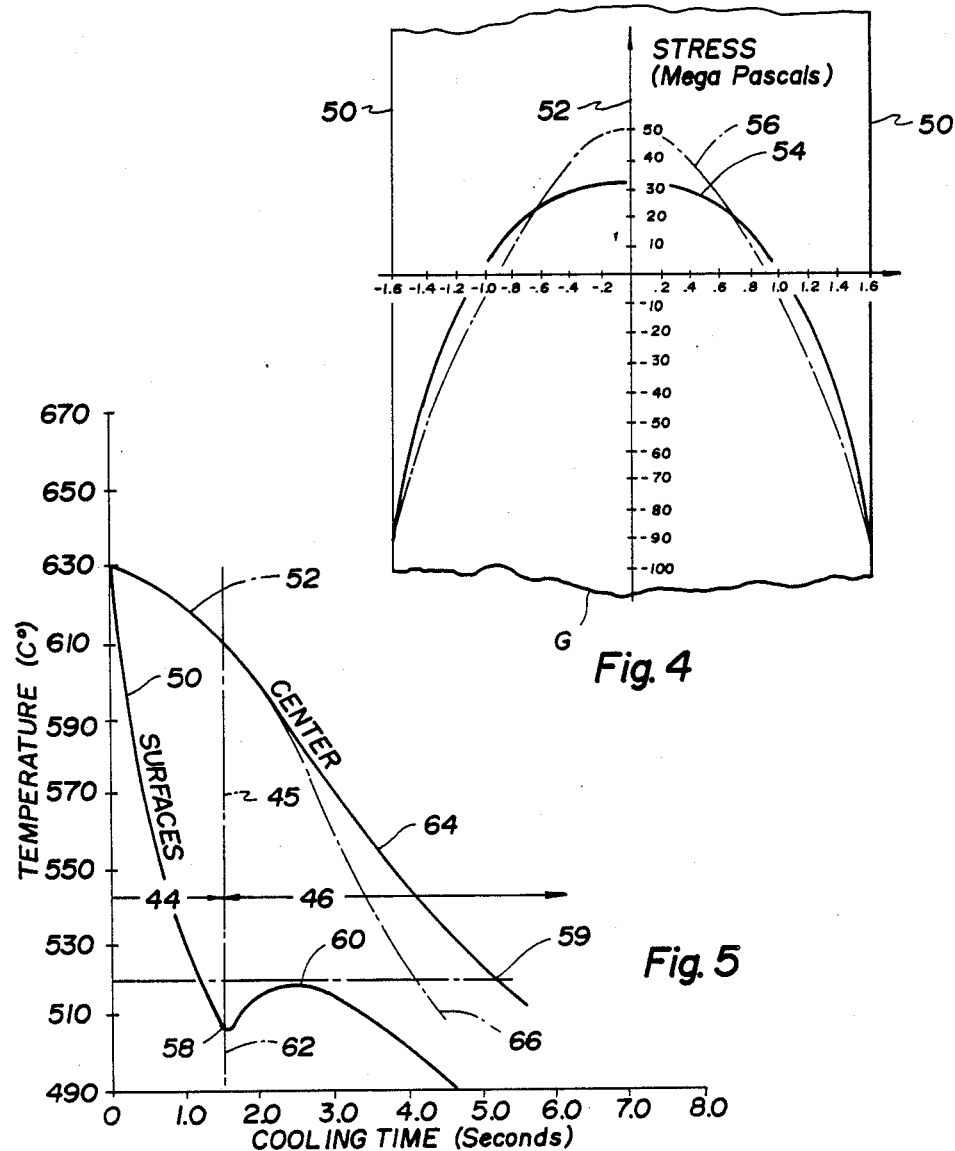
Fig. 4
Fig. 5

GLASS SHEET MODULATED QUENCHING

TECHNICAL FIELD

This invention relates to tempering of glass sheets.

BACKGROUND ART

Glass sheets are tempered to provide resistance to breakage. This tempering is performed by first heating the glass sheets to the tempering temperature which is normally a minimum of about 590° C. but preferably 600° to 620° C. or higher without being so hot that the glass sheet becomes too supple to control shape or too soft so as to be easily marked. The heated glass sheet is then suddenly cooled to establish a thermal gradient between the glass surfaces and the center. This thermal gradient is maintained during cooling below the strain point where stresses are essentially permanent, normally about 520° C., and require time periods of minutes for any stress to be relieved. Upon final cooling of the entire glass sheet to ambient temperature, the glass surfaces are in compression and the center is in tension. The surface compression makes the tempered glass sheet more resistant to breakage since most fractures occur in tension at the glass surface and thus must first overcome the compressive stress at the surface before breakage can take place.

Conventionally tempered glass sheets upon breakage fracture into many small fragments that are dull and relatively harmless as opposed to breaking into long shards. Recently, there has been a demand by the architectural industry for glass sheets with resistance to breakage as well as the capability of being maintained within a peripheral frame after breakage as can be done with annealed glass that breaks into shards as opposed to many fragments. Such a glass sheet that is resistant to breakage and does not break into small fragments may also be desirable for vehicle windshields so that the broken windshield will still permit viewing of the roadway so that the vehicle can be operated before the windshield is replaced.

While the ratio of the surface compression to center tension in glass sheets has often been regarded as being more or less fixed at about 2.0 for tempered glass, values of 2.6 have been experimentally obtained with air tempering but require that the glass be heated substantially higher than the normal tempering temperature. Also, the surface compression and center tension are both relatively high with such higher values of the ratio such that the glass dices upon breakage due to its high center tension. Thus, merely tempering glass with a high surface compression to center tension ratio without individually controlling surface compression and center tension is of less value than when those stresses can be individually controlled.

DISCLOSURE OF INVENTION

An object of the present invention is to provide an improved glass sheet tempering method and a resultant tempered glass sheet with surface compression and center tension that cannot be achieved with conventional tempering.

In carrying out the above object, the improved method provides tempering of a glass sheet heated to tempering temperature and is performed by initially conveying the heated glass sheet through a first cooling station that cools the oppositely facing surfaces of the glass sheet with a first rate of heat transfer for a finite time to cool the surfaces below the strain point without cooling the center of the glass sheet below the strain point. Thereafter, the glass sheet is conveyed through a second cooling station that cools the oppositely facing surfaces of the glass sheet at a second rate of heat transfer less than the first rate to cool the center of the glass sheet below the strain point and also further cool the surfaces. By such a modulated quenching, the glass sheet upon cooling to ambient temperature has surface compression and center tension that cannot be achieved with conventional tempering at a uniform rate of cooling. A quick change from the first rate of heat transfer to the second lesser rate of heat transfer can be achieved by the glass sheet conveyance as described between the first and second cooling stations.

The second rate of heat transfer at the second cooling station is of a magnitude such that the surface temperature initially increases without going substantially above the strain point prior to subsequently cooling.

The first rate of heat transfer and finite time thereof and the second rate of heat transfer are preferably selected with respect to the thickness of the heated glass sheet and its tempering temperature to provide center tension sufficiently low so as to prevent dicing of the glass sheet upon fracture and to also prevent spontaneous fracturing of the cooled glass sheet such as can take place due to nickel sulfide inclusions with conventionally tempered glass sheets having a greater center tension.

The present invention also contemplates the resultant glass sheet which is conveyed for heating and quenching by this modulated quenching method to provide the resultant stress pattern.

The objects, features, and advantages of the present invention are readily apparent from the following detailed description of the best mode for carrying out the invention as described in connection with the drawings.

BRIEF DESCRIPTION OF DRAWINGS

FIG. 3 is a graph illustrating the rates of heat transfer during the tempering wherein a first stage of cooling is at a greater rate than a second stage during modulated quenching that tempers the glass sheet;

FIG. 4 is a diagrammatical graph superimposed on the thickness of the tempered glass sheet to illustrate the stresses which result from the modulated quenching with the initial greater rate of cooling and the subsequent lesser rate of cooling as illustrated in FIG. 3; and FIG. 5 is a graph with solid line curves that illustrate the temperature of the glass sheet surfaces and center as the cooling is performed initially at the greater rate and subsequently at the reduced rate and also shows a phantom line curve that represents the center temperature with cooling at a uniform rate in accordance with conventional tempering.

BEST MODE FOR CARRYING OUT THE INVENTION

Figure 1:
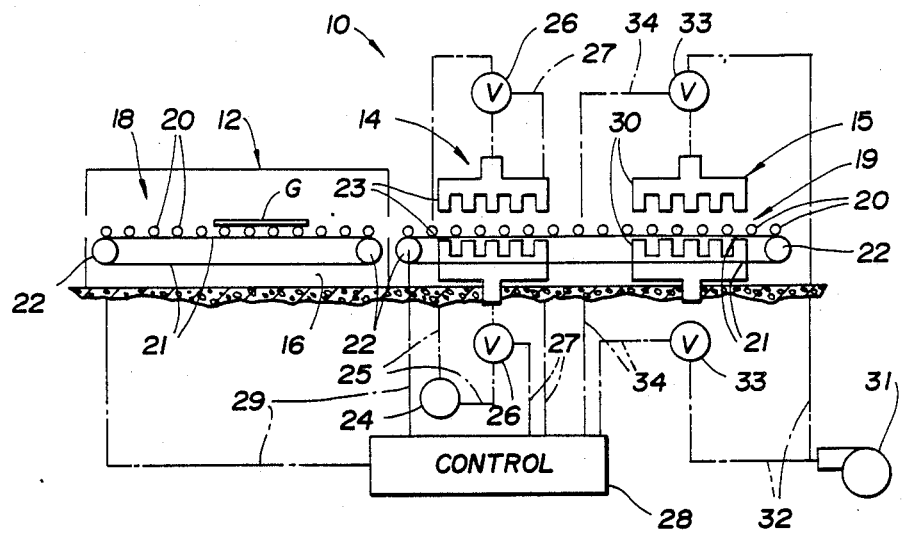
FIG. 1 is a schematic view of a glass sheet tempering system for performing the method of the present invention to produce the tempered glass sheets thereof.

With reference to FIG. 1 of the drawings, a schematically illustrated glass sheet tempering system is generally indicated by 10 and includes a furnace 12 as well as first and second quench or cooling stations 14 and 15 mounted adjacent each other on the factory floor 16. Furnace and quench roller conveyors 18 and 19 of the system each include rolls 20 that are rotatively driven by friction with associated continuous drive loops 21 trained over wheels 22 in accordance with the teachings of U.S. Pat. Nos. 3,806,312; 3,934,970; 3,947,242; and 3,994,711, the disclosures of which are hereby incorporated by reference, to provide conveyance of glass sheets G through the furnace 12 and the cooling stations 14 and 15 from the left toward the right as illustrated. Within the furnace 12, the conveyed glass sheet G is heated from ambient temperature to the tempering temperature, which normally must be at least 590° C. and preferably above 600° C. in the most preferred range of 620° C. to 630° C. or above without being too hot so the glass sheet is easily marked or too supple to maintain its shape. Thereafter, the heated glass sheet is conveyed from the furnace conveyor 18 to the quench conveyor 19 for conveyance through the first cooling station 14 between upper and lower blastheads 23 having nozzles that are fed compressed gas from a source 24 through conduits 25 controlled by valves 26 operated by connections 27 from a suitable control 28. This control 28 also has connections 29 to the furnace and quench conveyors 18 and 19 to coordinate the conveyance during indexing from the furnace 12 to the first cooling station 14 and to also permit independent operation of the two conveyors before and after such indexing. During the indexing into and conveyance through the first cooling station 14, the compressed gas fed to the blastheads 23 provides cooling gas to the upper and lower surfaces of the glass sheet with a sweep type motion during a first stage of quenching as is hereinafter more fully described. The second cooling station 15 has upper and lower blastheads 30 having nozzles that are fed pressurized quenching gas of a lower pressure from a blower 31 through conduits 32 controlled by valves 33 operated by connections 34 to the control 28.

Figure 2:
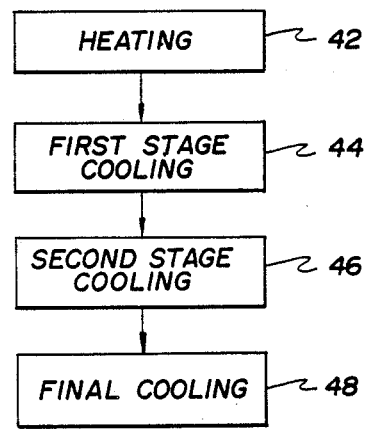
FIG. 2 is a diagrammatical view illustrating the steps of the method.

The glass sheet tempering of the present invention is performed by the steps illustrated in the diagrammatical view of FIG. 2 where the tempering cycle is begun by an initial heating step 42 which is performed in the furnace 12 as previously described. After the heating of the glass sheet to the tempering temperature so that the tempering can be performed, the glass sheet is then initially conveyed through the first cooling station 14 for a first stage of cooling 44 and is thereafter quickly conveyed from the first cooling station 14 to the second cooling station 15 for rapidly switching to a second stage of cooling 46. During the initial stage of cooling 44, the oppositely facing surfaces of the conveyed glass sheet are cooled with a first rate of heat transfer for a finite time, about 1 to 3 seconds for thin glass of approximately ⅛ inch thickness and as great as about 3–10 seconds for thicker glass, to cool the surfaces below the strain point without cooling the center of the glass sheet below the strain point. Thus, after completion of the first stage of cooling 44, the glass sheet surfaces will be hardened so as to act essentially as an elastic solid with respect to maintaining stresses, while the glass center at a higher temperature above the strain point will still act essentially as a viscous liquid with respect to relieving any stresses that may be caused by differences in cooling due to the thermal gradient between the surfaces and the center. Subsequently, after a quick transition 45 that happens almost instantaneously by the conveyance, the oppositely facing surfaces of the conveyed glass sheet are cooled during the second stage 46 at a second rate of heat transfer less than the first rate to cool the center of the glass sheet below the strain point without corresponding cooling of the surfaces. Subsequently, the second stage cooling 46 further cools the center and the surfaces. During this second stage cooling 46, the quench conveyor 19 can oscillate the glass sheet back and forth in the second cooling station 15 for the required cooling time. Thereafter, a final cooling step 48 provides cooling of the glass sheet to ambient temperature such that the glass sheet has surface compression and center tension that cannot be achieved with conventional tempering at a uniform rate of cooling. This final cooling step 48 can be performed by after-coolers downstream from the cooling station 15 or by natural convection of ambient air.

Adjustment of the modulated quench is done by changing the first greater rate of cooling 44, the second rate of cooling 46, and the finite time of the first greater rate of cooling, the latter of which is controlled by the speed of conveyance and the length of the blastheads 23 of the first cooling station. Such adjustment enables the modulated quenching to provide compression at the glass surfaces 50 and tension at the glass center 52 as shown in FIG. 4 by the solid line indicated stress curve 54 which is shown in comparison to the phantom line indicated stress curve 56 that results from cooling at a uniform rate. It will be noted that the stress curve 54 that results from the modulated quenching has surface compression of the same magnitude as with conventional quenching but has a lesser center tension so as to have less tendency to break into small fragments upon fracture than is the case with conventional quenching at a uniform rate throughout cooling of both the surfaces and the center from the tempering temperature to below the strain point. Also, it will be noted that the neutral planes of no stress are closer to the respectively adjacent surfaces than with conventional quenching.

It is believed that maintaining the center tension below about 35 MegaPascals prevents dicing of ⅛ inch thick glass and also prevents spontaneous fracturing such as can occur from nickel sulfide inclusions in glass of that thickness. It is also believed that even better results can be achieved when the center tension is maintained at or below about 30 MegaPascals for ⅛ inch thick glass in order to prevent dicing and spontaneous fracturing. For ¼ inch thick glass, the center tension is preferably maintained below 30 MegaPascals and most preferably below 25 MegaPascals to prevent dicing and spontaneous fracturing. The center tension thus must be lower for thicker glass. It is also possible for any given center tension to obtain a greater magnitude of surface compression with the modulated quenching than can be achieved with conventional quenching using a uniform rate of cooling.

As shown in FIG. 5, the temperature of the glass sheet surfaces 50 during the first stage of cooling 44 rapidly decreases from the tempering temperature which is illustrated at about 630° C. This rapid decrease in the surface temperature proceeds until the transition 45 to the second stage of cooling 46 where the rate of cooling is quickly decreased as permitted by the switching function resulting from the conveyance of the glass sheet from the first cooling station 14 to the second cooling station 15. In an ideal situation, the surfaces would be cooled just down to or slightly below the strain point by the first stage of cooling and would be maintained there during the initial part of the second stage cooling as the center continues to cool. This cooling of the surfaces without concomitant cooling of the center reduces the ultimate center tension in relationship to the surface compression. However, such ideal processing cannot be easily performed. Rather, the first stage cooling in practice cools the surfaces slightly below the strain point, about 20° C. as illustrated, and thereafter the second rate of heat transfer is of a magnitude so that the center continues cooling while the surface temperature increases from the point 58 for a short period of time. This interim surface temperature increase proceeds without going back substantially above the strain point 59 so that the glass surfaces do not relieve their stresses and thus lose the temper that has been induced into the glass sheet. Upon the interim surface temperature increase back up to a point 60, the surface temperature again begins to decrease but at a much slower rate than is the case with conventional tempering at a uniform cooling rate as shown by phantom line curve 62. During the initial stage of cooling 44, the temperature of the glass sheet center 52 decreases but is still above the strain point 59 upon reaching the transition 45 unlike the surfaces 50 which are below the strain point as previously discussed. During the second stage of cooling 46 at a lower rate of heat transfer, the center 52 of the glass sheet continues to cool but has a slower rate as shown by curve 64 than is the case with conventional tempering at a uniform cooling rate as shown by the phantom line curve 66.

It should be appreciated that the modulated quenching performed in accordance with the present invention to produce the types of glass sheets thereof as described above differs from the prior art in the manner in which the surface compression and center tension can be individually adjusted with respect to each other in order to achieve the desired result. As previously mentioned, the cooling of the surfaces from tempering temperature to below the strain point must take place with the center still above the strain point as the transition takes place from the first rate of cooling to the second rate of lesser cooling. The parameters which affect the final stress distribution include: the magnitudes of the first and second rates of cooling, the temperature of the glass prior to the initial cooling, the time period of the initial cooling as controlled by the speed of conveyance and the length of the first cooling station, the thickness of the glass, and the type of glass insofar as its chemistry affects the strain point range and the heat transfer through the thickness of the glass sheet.

In testing conducted on 12 inch by 12 inch glass samples ¼ inch thick heated to 640° C. and 625° C., the first stage of tempering was performed for times between 1 and 3.5 seconds with the best results achieved at about 2 seconds. First stage cooling rates of 100 to $135 \times 10^{-4}$ cal/cm$^2$–sec–°C. were used for the ¼ inch thick glass at 640° C. and of 80 to $100 \times 10^{-4}$ cal/cm$^2$sec°C. were used for the ¼ inch thick glass at 625° C. Second stage cooling rates of about $14 \times 10^{-4}$ cal/cm$^2$sec°C. were used for the ¼ inch thick glass at 640° C. and of about $15 \times 10^{-4}$ cal/cm$^2$sec°C. for the ¼ inch thick glass at 625° C.

In testing conducted on 12 inch by 12 inch glass samples ⅛ inch thick heated to 640° C., first and second stage cooling rates of 120 and $30 \times 10^{-4}$ cal/cm$^2$sec°C. were used with the first stage lasting for 1 to 2.5 seconds.

Both the ¼ inch and ⅛ inch thick glass processing had the first stage cooling provided by compressed gas at about 30 to 50 psi and second stage cooling provided by blower gas pressurized at about 4 to 5 inch of H$_2$O.

While the best mode for carrying out the invention has been described in detail, those familiar with the art to which this invention relates will recognize various alternative designs and embodiments for carrying out the invention as described by the following claims.

What is claimed is:

1. A method for tempering a glass sheet heated to tempering temperature, the method comprising:

initially conveying the heated glass sheet through a first cooling station that cools the oppositely facing surfaces of the glass sheet with a first rate of heat transfer for a finite time to cool the surfaces below the strain point without cooling the center of the glass sheet below the strain point; and thereafter conveying the glass sheet through a second cooling station that cools the oppositely facing surfaces of the glass sheet at a second rate of heat transfer less than the first rate to cool the center of the glass sheet below the strain point and further cool the surfaces, the second rate of heat transfer at the second station being of a magnitude such that the surface temperature initially increases without going substantially above the strain point prior to subsequently cooling, whereby the glass sheet upon ultimate cooling to ambient temperature has surface compression and center tension that cannot be achieved with conventional tempering at a uniform rate of cooling.

2. A method as in claim 1 wherein the first rate of heat transfer and finite time thereof and the second rate of heat transfer are selected with respect to the thickness of the heated glass sheet and its temperature to provide center tension sufficiently low so as to prevent dicing of the glass sheet upon fracture.

3. A method as in claim 1 wherein the first rate of heat transfer and finite time thereof and the second rate of heat transfer are selected with respect to the thickness of the heated glass sheet and its temperature to provide center tension sufficiently low to prevent spontaneous fracturing of the cooled glass sheet.

4. The invention comprising: a tempered glass sheet having surface compression and center tension provided by:

heating the glass sheet to tempering temperature;

subsequently cooling the oppositely facing surfaces of the glass sheet with a first rate of heat transfer for a finite time to cool the surfaces below the strain point without cooling the center of the glass sheet below the strain point; and thereafter cooling the oppositely facing surfaces of the glass sheet at a second rate of heat transfer less than the first rate to cool the center of the glass sheet below the strain point and further cool the surfaces, the second rate of heat transfer being of a magnitude such that the surface temperature initially increase without going back substantially above the strain point prior to subsequently cooling, whereby the glass sheet upon ultimate cooling to ambient temperature has surface compression and center tension that cannot be achieved with conventional tempering at a uniform rate of cooling.

* * * * *